United States Patent [19]

Keegan

[11] Patent Number: 5,040,240
[45] Date of Patent: Aug. 13, 1991

[54] RECEIVER ARCHITECTURE FOR USE WITH A GLOBAL POSITIONING SYSTEM

[75] Inventor: Richard G. Keegan, Torrance, Calif.

[73] Assignee: Magnavox Government and Industrial Electronics Company, Fort Wayne, Ind.

[21] Appl. No.: 443,296

[22] Filed: Nov. 30, 1989

[51] Int. Cl.$^5$ ............................................... H04B 7/00
[52] U.S. Cl. ....................... 455/260; 455/264; 455/315; 342/356; 342/357; 364/444; 364/449
[58] Field of Search ............... 455/314, 315, 226, 264, 455/260, 272; 342/352, 356, 357, 367; 364/443, 444, 449; 375/93, 95, 96

[56] References Cited

U.S. PATENT DOCUMENTS

| | | | |
|---|---|---|---|
| 3,887,794 | 6/1975 | Katz et al. | 364/449 |
| 4,063,173 | 12/1977 | Nelson et al. | 455/315 |
| 4,476,585 | 10/1984 | Reed | 455/264 |
| 4,580,289 | 4/1986 | Enderby | 455/314 |
| 4,785,463 | 11/1988 | Jane et al. | 364/443 |

FOREIGN PATENT DOCUMENTS

| | | | |
|---|---|---|---|
| 67270678 | 11/1986 | Japan | 342/356 |
| 63-40878 | 2/1988 | Japan | 342/357 |
| 1-88272 | 4/1989 | Japan | 342/357 |
| 2170672 | 8/1986 | United Kingdom | 342/357 |

*Primary Examiner*—Reinhard J. Eisenzopf
*Assistant Examiner*—Lisa Charouel
*Attorney, Agent, or Firm*—Noel F. Heal; Richard T. Seeger

[57] ABSTRACT

A demodulation frequency plan for use in a global positioning system (GPS) receiver, having three demodulation stages for L1 and L2 signal channels, in which identical local oscillator frequencies are used in the L1 and L2 channels at each demodulation stage, to minimize phase error differences between the two channels. The third stage provides an output at an intermediate frequency high enough to carry the full information bandwidth, thereby simplifying digital sampling of the signal, which is also performed in the third stage. Sampling is performed at a high enough rate to facilitate subsequent conversion to baseband. Moreover, the sampling rate is a binary multiple of the intermediate frequency, and this binary relationship further simplifies conversion to baseband.

5 Claims, 2 Drawing Sheets

RECEIVER ARCHITECTURE FOR USE WITH A GLOBAL POSITIONING SYSTEM

BACKGROUND OF THE INVENTION

This invention relates generally to receivers for use in conjunction with a global positioning system (GPS) and, more particularly, to demodulation and baseband processing techniques used in GPS receivers. The selection of intermediate frequencies and local oscillator frequencies used in a receiver is known as the frequency plan. As will shortly be appreciated, the choice of these and other parameters in the receiver represents a difficult task if all of the desired requirements of the receiver are to be met. For a better understanding of the various problems relating to choice of a frequency plan, the fundamental operation of the GPS will first be described.

GPS, also called NAVSTAR, is a system for determining the position of a user on or near the earth, from signals received from multiple orbiting satellites. When the system is fully deployed, the orbits of the satellites will be arranged in multiple orbit planes, such that signals can be received from at least four satellites at any selected point on or near the earth.

The orbits of the orbiting spacecraft are determined with accuracy from fixed ground stations and are relayed back to the spacecraft. In navigation applications of GPS, the latitude, longitude and altitude of any point close to the earth can be calculated from the times of propagation of electromagnetic energy from four or more of the spacecraft to the point on or near the earth. In general, at least four satellite signals need to be received at a ground station in order to determine the complete position, since there are four unknown quantities. Three of the unknowns are the three-dimensional position coordinates, which may be conveniently expressed in terms of latitude, longitude and altitude, and the fourth unknown quantity is a time difference or offset between timing clocks on the satellites and a timing clock at the receiver. For normal operation of the system, the clocks used to regulate operation of transmitters on the satellites are effectively all synchronized, or at least the differences between them are known. However, the clock used to control operations at the receiver is typically out of synchronization with the satellite clocks to some degree, and this error cannot be eliminated without having the benefit of one more satellite measurement than there are position coordinates to be determined. Thus, for three-dimensional position determination, at least four satellite signals are needed.

The nature of the signals transmitted from GPS satellites is well known from the literature, and will be described in more detail in the description of the preferred embodiment of the invention. In brief, each satellite transmits two spread-spectrum signals in the L band, known as L1 and L2, with separate carrier frequencies. Two signals are needed to eliminate an error that arises due to the refraction of the transmitted signals by the ionosphere. The satellite signals are modulated by two pseudorandom codes, one referred to as the C/A (coarse/acquisition) code, and the other referred to as the P (precise) code, and by a slower-varying data signal defining the satellite orbits and other system information. A pseudorandom code sequence is a series of numbers that are random in the sense that each one bears no discernible relation to the ones that precede it, but are not truly random, because the sequence repeats itself cyclically.

When a binary pseudorandom code is used to modulate the phase of a carrier signal, the result is a signal having a spectral density that follows a $[(\sin x)/x]^2$ distribution. This "spread spectrum" signal has the advantage of being more immune to jamming or interference than a narrowband signal. The spectrum of a signal modulated by a pseudorandom code has the useful property that, when the signal is properly correlated with a replica of the same pseudorandom code, the spread spectrum energy is mapped as a large narrow peak in the spectrum, but only if the two correlated signals are properly synchronized in time. This property can be used to identify and separate signals from multiple satellites, by correlating a received signal with multiple locally generated pseudorandom code sequences. Each GPS satellite uses unique P code and C/A code sequences, which are publicly known. Therefore, a particular satellite is identifiable by the correlation of a received signal with a locally generated code sequence corresponding to that satellite. Once a received signal is identified and decoded, the receiver can measure an apparent transmission time from the satellite, from which an apparent range, or pseudo-range, is computed. Signals transmitted from each satellite define the time and position of the satellite at certain signal epochs whose times of reception can be measured at the receiver. The transmit times are all measured with reference to a common time base referred to as GPS system time. Each receiver uses its own local time reference for recording the receive times of signals from the satellites. Thus each receiver has knowledge of the transmit times measured in GPS system time and the receive times measured in local time. If there is at least one more satellite signal than there are positional unknown quantities, the time differential between the local time and satellite time can be determined along with the positional unknown quantities. For example, four satellite signals are needed to find three positional unknowns and the time differential. From the pseudo-range data, the position of the receiver on or near the earth can be computed to a high degree of accuracy, depending on the accuracy of the orbit data.

Demodulation of a carrier signal is usually performed by a process of multiplication of the received signal with a locally generated oscillatory signal, referred to as the local oscillator or LO. When two signal are combined in this way, the process produces components with frequencies that are the sum and the difference of the received and local frequencies. The sum components are usually discarded by appropriate filtering. The frequency difference components contain the same information as the received signal, but down-converted to a lower carrier frequency, referred to as an intermediate frequency. There may be several such intermediate stages of demodulation before the baseband signals are obtained, to provide the previously modulated information without carrier components. In a modern GPS receiver, the baseband signal is converted to digital form by a sampling stage.

One of the difficulties of devising a frequency plan for demodulating the L1 and L2 suppressed carrier signals is that it would be desirable to use a common reference frequency and to use, as far as possible, the same local oscillator frequency for L1 and L2 demodulation, at each stage of demodulation. This would result in a practically identical phase relationship between L1 and L2 and practically identical phase errors introduced in the demodulation process. However, although some frequency plans use the same local oscillator frequency at the first stage, it is thought to be difficult, if not impossible, to use identical local oscillator frequencies at every stage and still satisfy other important requirements for GPS demodulation.

Another important requirement is that it is highly desirable that the sampling stage should yield a signal that still contains a sufficiently high intermediate frequency, above baseband, to carry the coded information. If this requirement is not met, the sampling stage has added complexities of multibit sampling or sampling of both in-phase (I) and quadrature (Q) components of the signal. In addition, not addressing these added complexities in the receiver design will introduce unwanted signal attenuation and adversely affect the overall signal-to-noise ratio of the receiver.

Another general requirement is that the frequency plan should facilitate baseband processing of the signals in digital form. As will shortly be appreciated from the following summary, the present invention meets these and other additional requirements.

SUMMARY OF THE INVENTION

The present invention resides in a demodulation circuit for use in a global positioning system (GPS) receiver. Basically, and in general terms, the demodulation circuit of the invention includes a reference oscillator generating a frequency of nominally F, or an integral multiple of F, where F=5.115 MHz. Also included are first, second and third demodulation stages for demodulating an L1 GPS signal in an L1 signal channel, and first, second and third demodulation stages for demodulating an L2 GPS signal in an L2 signal channel. The circuit also has a frequency synthesizer coupled to the reference oscillator, for generating a first local oscillator frequency for application to the first demodulation stages of the L1 and L2 signal channels, and for generating a second local oscillator frequency for application to the second demodulation stages of the L1 and L2 signal channels. Also included is means for applying the reference oscillator signal to the third demodulation stage of the L1 and L2 signal channels in such a manner that each signal channel after the third stage of demodulation is still modulated at the some intermediate frequency.

The third demodulation stage also effects digital sampling at a rate that is a binary multiple of the intermediate frequency after the third stage of demodulation. In the frequency plan as disclosed, the local oscillator frequency for the first demodulation stages is nominally 270F, and the local oscillator frequency for the second demodulation stages is nominally 33.75F. The effective local oscillator frequency for the third demodulation stages is nominally 4F, that is twice the digital sampling rate in the third stages, which is nominally 2F. The intermediate frequency after the third stages of demodulation is nominally 0.25F in both the L1 and the L2 signal channels.

In the circuit as disclosed by way of example, the frequency synthesizer includes a voltage-controlled oscillator (VCO) having a nominal output frequency of 270F for application to the first demodulation stages, a first frequency divider connected to the VCO to provide a nominal frequency of 33.75F for application to the second demodulation stages, a second frequency divider connected to the VCO to provide a nominal frequency of 0.25F, a third frequency divider connected to the reference oscillator to provide a nominal frequency of 0.25F, and a phase detector connected to receive the signals from the second and third frequency dividers and connected to provide a control signal to the VCO to lock its operation to the reference oscillator frequency.

The demodulation circuit as disclosed also includes a baseband demodulation stage, for converting the signals output from the third demodulation stages from the intermediate frequency to baseband.

It will be understood from this brief summary that the present invention represents a novel and possibly unique solution to the problems that confront a designer of demodulation circuitry for a GPS receiver. In particular, the invention permits the use of identical local oscillator frequencies at each demodulation stage of both signal channels, and meets other important requirements that simplify the demodulation of GPS signals. Other aspects and advantages of the invention will become apparent from the following more detailed description, taken in conjunction with the accompanying drawings.

DESCRIPTION OF THE PREFERRED EMBODIMENT

Figure 1:
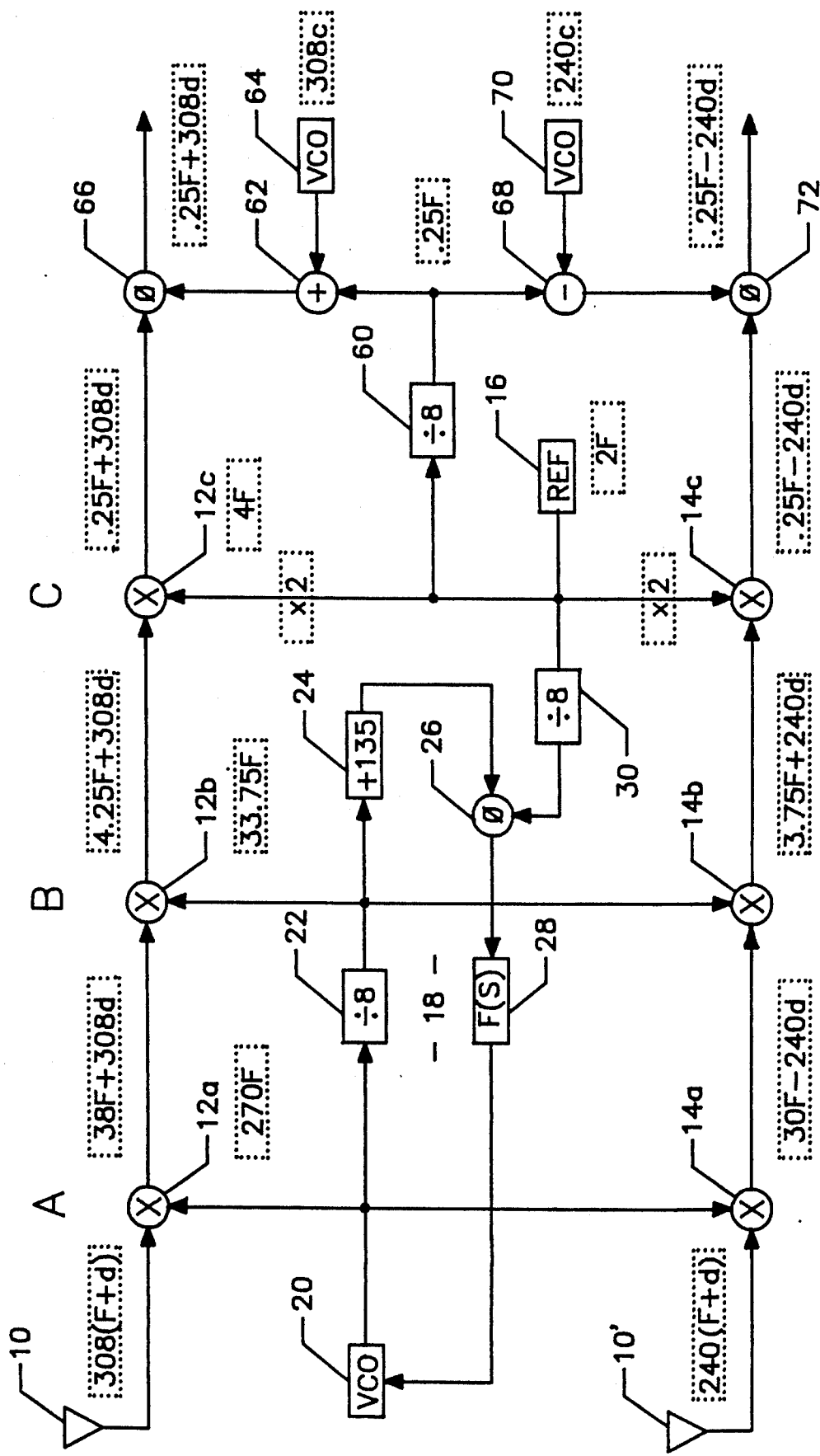
FIG. 1 is a schematic representation of the demodulation frequency plan of the invention.

As shown in the drawings for purposes of illustration, the present invention is concerned with a demodulation frequency plan for use in a global positioning system (GPS) receiver. Basically, the receiver includes three demodulation stages, referred to generally in FIG. 1 as stages A, B and C. Further, the receiver is shown as receiving two signals, designated the L1 and the L2 signals, on antennas 10 and 10', although it will be understood that these may, in fact be embodied in a single antenna.

The L1 signal is known to have a frequency of 1,575.42 megahertz (MHz), which may be expressed as 308F MHz, where F is a standard GPS reference frequency of 5.115 MHz. Every received signal is subject to a Doppler shift in frequency, because the satellite that transmitted the signal is moving relative to the receiver. For convenience in representing the actual frequency received, this Doppler shift is scaled to a value d, which may be added to F. That is to say, the absolute Doppler shift for the L1 signal is 308d, but the received signal can be conveniently represented as having a frequency of 308(F+d) MHz. Similarly, the L2 signal has a nominal frequency of 1227.60 MHz, or 240F MHz. The received L2 signal, including Doppler shift, is represented as having a frequency of 240(F+d) MHz. For convenience, the units of frequency are omitted from the drawings, and will be omitted from the discussion that follows.

The L1 signal is processed by the three demodulation stages in turn, in demodulators 12a, 12b and 12c, while the L2 signal is processed by three corresponding demodulators 14a, 14b and 14c. Each demodulation stage comprises a multiplier and an associated filter (not shown) for producing the difference frequency of its two inputs. The two inputs are the L1 signal and a local oscillator signal. In accordance with the invention, the nominal values of the local oscillator frequencies applied to the demodulators 12a and 14a are identical, as are the local oscillator frequencies applied to the demodulators 12b and 14b, and the local oscillator frequencies applied to the demodulators 12c and 14c. More specifically, the nominal local oscillator frequencies applied to the A, B and C demodulator stages are 270F, 33.75F and 4F, respectively. Moreover, the third stage C is a digital sampling stage, as will be described.

The local oscillator frequencies are all generated from a common reference oscillator 16, which provides a signal at frequency 2F, feeding into a phase-locked loop, indicated generally at 18. The manner in which the various frequencies are generated is not critical to the invention, but will be briefly described. The phase-locked loop 18 includes a voltage-controlled oscillator 20, a first frequency divider 22, a second frequency divider 24, a phase detector 26, and a VCO control circuit 28. The reference oscillator 16 is connected to another frequency divider 30, which reduces the 2F reference by a factor of eight to a frequency of 0.25F, which is applied to one terminal of the phase detector 26. The output of the phase detector is processed in circuit 28 to produce a VCO control signal. When the VCO 20 is producing its nominal frequency it produces a signal at 270F, which is applied to the first-stage demodulators 12a and 14a. This signal is also divided by eight in frequency divider 22, to obtain a frequency of 33.75F, which is applied to the second-stage demodulators 12b and 14b. This second-stage frequency is also divided by a factor of 135 in frequency divider 24, to obtain a frequency of 0.25F, which is applied to the other terminal of the phase detector 26. So long as the phases of the signals at 0.25F input to the phase detector are identical, the VCO is locked to its nominal frequency, and the desired first and second local oscillator frequencies are generated.

In the L1 channel, the first stage of demodulation produces a difference frequency of $308(F+d)-270F = 38F+308d$. After the second stage of demodulation, this is further reduced by generating the difference frequency $38F+308d-33.75F=4.25F+308d$. In the L2 channel, the result of the first stage of demodulation is the difference frequency $270F-240(F+D)=30F+240d$, and the result of the second stage of demodulation is $33.75F-(30F-240d)=3.75F+240d$.

The third demodulation stage is also the digital sampling stage, and the reference frequency 2F from the reference generator 16 is applied to the demodulators 12c and 14c. However, the manner in which the sampling is performed changes the effective local oscillator frequency from 2F to 4F. As shown in FIG. 2 for the L1 channel, after first-stage demodulation the L1 signal at $38F+308d$ is applied to an amplifier 40 and then to a bandpass filter 42, the output of which passes into another amplifier 44, and into the second-stage demodulator multiplier 12b. The output, at a frequency of $4.25+308d$, passed through another bandpass filter and amplifier 46 and then enters a hard limiter 48, which limits the amplitude of the signal and effectively produces a square-wave signal, which is coupled to the D terminal of a D-type flip-flop 50. The clock terminal of the flip-flop 50 is connected to the 2F signal from the reference oscillator 16 (FIG. 1) and, by a process of aliasing, there is an effective local oscillator frequency of 4F. The output of the flip-flop 50 is a digital signal at $0.25F+308d$, and this is applied to a baseband circuit 52, which performs a standard in-phase and quadrature baseband demodulation and is coupled to a receiver processor 54 for further processing of the signals.

An important aspect of the invention is that, the L1 and L2 signals, after the sampling stage, are still modulated onto an intermediate-frequency carrier. That is to say, the signals are not reduced to baseband at the third stage of demodulation prior to digital sampling. Moreover, the intermediate frequency is sufficient to carry the information originally encoded on the L1 and L2 channels. More specifically, the intermediate frequency after the third stage is given by the difference $4.25F+308d - 4F = 0.25F+308d$, for the L1 channel. For the L2 channel, the intermediate frequency is given by the difference $4F-(3.75F+240d)=0.25F-240d$. The intermediate frequency 0.25F is approximately 1.27 MHz, which is sufficient to carry the information bandwidth of approximately 1 MHz. As a result of this, only one sampling circuit is required to digitize the signals. If this requirement were not met, there would be added complexities of multi-bit sampling and sampling in-phase and quadrature components of the signal.

The final step in demodulation is conversion of the third-stage demodulator outputs to baseband. This stage is also facilitated, mainly because of the chosen relationship between the 2F sampling frequency used in the sampling stage and the intermediate frequency 0.25F of the sampling stage output. Because the intermediate frequency is a binary fraction ($\frac{1}{8}$th) of the sampling frequency 2F, baseband processing is simplified.

Figure 2:
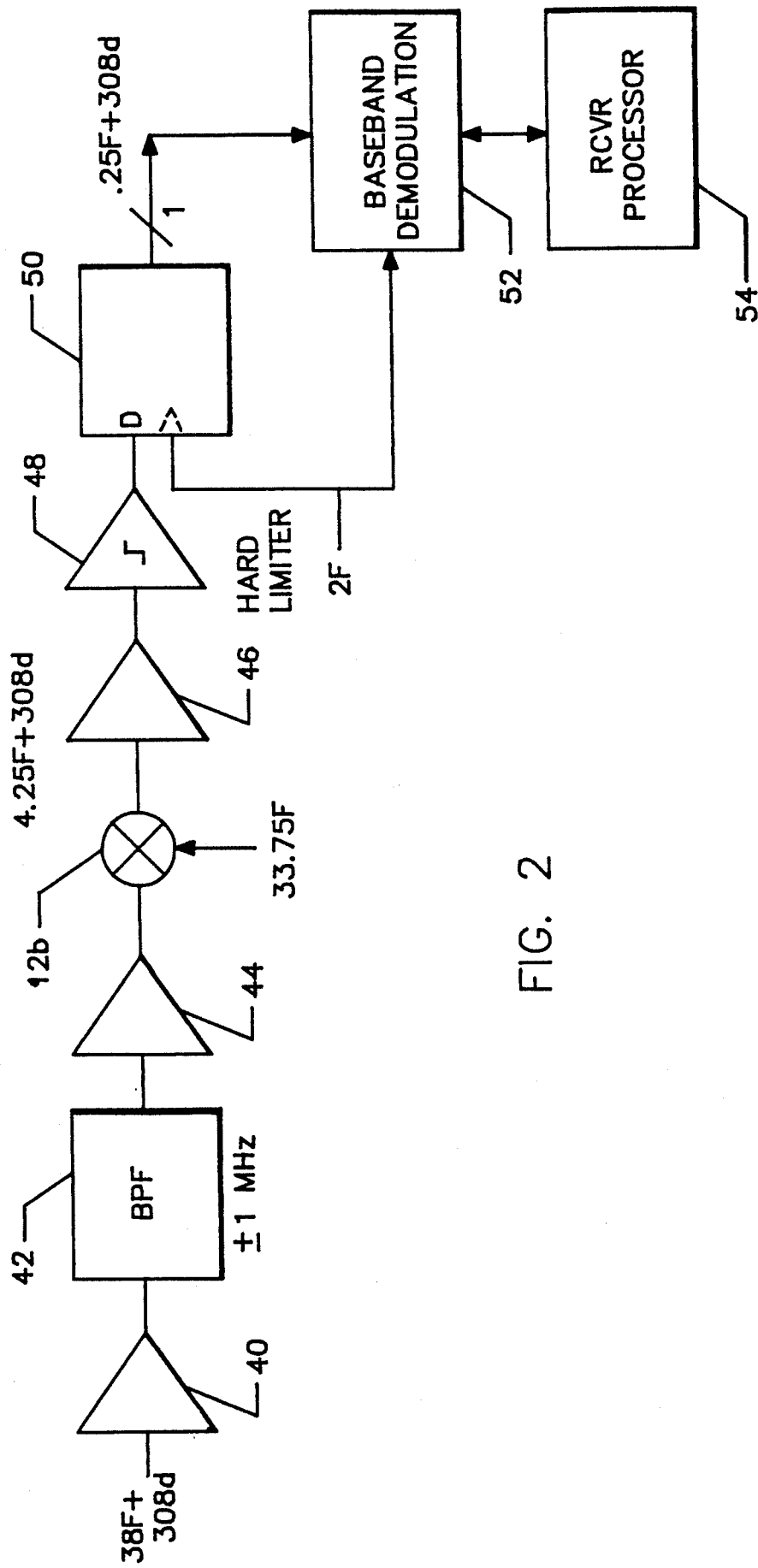
FIG. 2 is a fragmentary block diagram of the L1 receiver channel, from after the first demodulation stage to baseband processing.

As shown in FIG. 1, conversion to baseband is basically a matter of generating a signal of frequency $0.25F+308d$, for the L1 channel, and a signal of frequency $0.25F-240d$, for the L2 channel. The 0.25F component is obtained from the reference oscillator 16, through another frequency divider 60, used to divide the reference by eight. The output of this binary divider is precisely three bits of binary phase of 0.25F. This 0.25F reference is applied to one input of a phase adder circuit 62, the other input of which is derived from a digital VCO 64 that generates the binary phase of a signal at frequency $308d$. The output of the adder 62 is applied to a phase detector 66, to which the third-stage demodulator output is also applied. The output from the phase detector 66 is a baseband signal derived from the phase modulations of the L1 signal. The L2 channel is processed in a similar way, using a phase subtraction circuit 68, a digital VCO 70 for generating the binary phase of a signal at frequency $240d$, and a phase detector 72 producing the required baseband signals.

Generation of both the Doppler VCO signal, in blocks 64 and 70, and generation of the intermediate frequency component, are simplified by the binary relationship between the intermediate frequency 0.25F and the sampling rate 2F. Generation of the 0.25F signal for application to the summing and subtraction circuits 62 and 68 is merely a matter of dividing the 2F reference frequency by eight in a binary counter. The binary relationship of the sampling and intermediate frequencies also facilitates the addition of the phase of the Doppler components $308d$ and $240d$ to the 0.25F component. If the frequency divider 60 takes the form of a three-bit counter, the three counter stages provide a binary encoded measure of the phase of the reference signal, with each least-significant bit counting as $\frac{1}{8}$th of a cycle, or 45 degrees of phase. To obtain the Doppler term, a signal proportional to the rate of change of phase is digitally integrated to provide a binary representation of phase angle, and this is digitally summed with the three-bit representation of the reference signal. Basically, this is the summation performed in block 62. These operations can be performed most efficiently if there is a binary relationship between the reference and intermediate frequencies. After the generation of a digital form of the (0.25F+308d) signal, sine and cosine tables are used to look up in-phase (I) and quadrature (Q) components for use in the phase detector 66. Moreover, the digitizing rate in the sampling stage is high enough that the phase detector can be implemented as a multiplier, rather than as a trigonometric phase rotator, since the twice-frequency term of the simple multiplier is still in the sampling bandwidth of the circuit.

The design details of the digital to baseband conversion, and the details of additional baseband processing, are not part of the invention. However, as noted above, use of the frequency plan of the invention greatly simplifies the design of conventional circuitry for conversion to baseband.

It will be appreciated from the foregoing that the present invention represents an innovative solution to the difficulties involved in the demodulation of GPS signals. In particular, the invention provides a unique combination of demodulation stages, such that the same local oscillator frequencies can be used for L1 and L2 channels at each stage of demodulation. Moreover, the final stage effects sampling of the signal at a rate high enough to simplify conversion to baseband, and leaves an intermediate frequency high enough to carry the information bandwidth of the channel. Additionally, the intermediate frequency is a binary fraction of the sampling frequency, a relationship that greatly simplifies conversion to baseband. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A demodulation circuit for use in a global positioning system (GPS) receiver, comprising:
    a reference oscillator generating a frequency of nominally F or an integral multiple thereof, where F=5.115 MHz;
    first, second and third demodulation stages for demodulating an L1 GPS signal in an L1 signal channel;
    first, second and third demodulation stages for demodulating an L2 GPS signal in an L2 signal channel;
    a frequency synthesizer coupled to the reference oscillator, for generating a first local oscillator frequency for application to the first demodulation stages of the L1 and L2 signal channels, and for generating a second local oscillator frequency for application to the second demodulation stages of the L1 and L2 signal channels; and
    means for applying the reference oscillator signal to the third demodulation stage of the L1 and L2 signal channels in such a manner that each signal channel after the third stage of demodulation is still modulated at the same nominal intermediate frequency.

2. A demodulation circuit as defined in claim 1, wherein:
    the third demodulation stage also effects digital sampling at a rate that is a binary multiple of the intermediate frequency after the third stage of demodulation.

3. A demodulation circuit as defined in claim 2, wherein:
    the local oscillator frequency for the first demodulation stages is nominally 270F;
    the local oscillator frequency for the second demodulation stages is nominally 33.75F;
    the effective local oscillator frequency for the third demodulation stages is nominally 4F;
    the digital sampling rate in the third stages is nominally 2F and is derived directly from the reference oscillator; and
    the intermediate frequency after the third stages of demodulation is nominally 0.25F in both the L1 and the L2 signal channels.

4. A demodulation circuit as defined in claim 3, wherein the frequency synthesizer includes:
    a voltage-controlled oscillator (VCO) having a nominal output frequency of 270F for application to the first demodulation stages;
    a first frequency divider connected to the VCO to provide a nominal frequency of 33.75F for application to the second demodulation stages;
    a second frequency divider connected to the VCO to provide a nominal frequency of 0.25F;
    a third frequency divider connected to the reference oscillator to provide a nominal frequency of 0.25F; and
    a phase detector connected to receive the signals from the second and third frequency dividers and connected to provide a control signal to the VCO to lock its operation to the reference oscillator frequency.

5. A demodulation circuit as defined in claim 4, and further comprising:
    a baseband demodulation stage for converting the signals output from the third demodulation stages from the intermediate frequency to baseband.

* * * * *